(12) United States Patent
Park et al.

(10) Patent No.: US 11,233,283 B2
(45) Date of Patent: Jan. 25, 2022

(54) BATTERY MODULE CASE AND BATTERY MODULE COMPRISING THE SAME

(71) Applicant: LG Chem, Ltd., Seoul (KR)

(72) Inventors: Eun Suk Park, Daejeon (KR); Se Woo Yang, Daejeon (KR); Yoon Gyung Cho, Daejeon (KR); Yang Gu Kang, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/488,389

(22) PCT Filed: Jul. 9, 2018

(86) PCT No.: PCT/KR2018/007749
§ 371 (c)(1),
(2) Date: Aug. 23, 2019

(87) PCT Pub. No.: WO2019/013508
PCT Pub. Date: Jan. 17, 2019

(65) Prior Publication Data
US 2020/0251789 A1 Aug. 6, 2020

(30) Foreign Application Priority Data
Jul. 10, 2017 (KR) .................. 10-2017-0087121

(51) Int. Cl.
*H01M 10/48* (2006.01)
*H01M 2/10* (2006.01)
(Continued)

(52) U.S. Cl.
CPC ..... *H01M 10/488* (2013.01); *H01M 10/0585* (2013.01); *H01M 10/482* (2013.01);
(Continued)

(58) Field of Classification Search
CPC ............. H01M 10/482; H01M 10/488; H01M 10/0585; H01M 2/1077; H01M 2/365;
(Continued)

(56) References Cited

U.S. PATENT DOCUMENTS

2017/0047559 A1 2/2017 Yoo et al.
2018/0076493 A1* 3/2018 Park .................. H01M 10/0525

FOREIGN PATENT DOCUMENTS

EP 3093907 A1 11/2016
EP 3264492 A1 1/2018
(Continued)

OTHER PUBLICATIONS

European Search Report for EP 18832519, dated Feb. 19, 2020, 15 pages.
(Continued)

*Primary Examiner* — Osei K Amponsah
(74) *Attorney, Agent, or Firm* — Lerner, David, Littenberg, Krumholz & Mentlik, LLP

(57) ABSTRACT

The present application can provide a battery module case applicable to an automation process, a battery module comprising the same, a battery pack comprising such a battery module and an automobile comprising such a battery module or pack. The present application can provide a battery module at low cost by applying an automation process.

19 Claims, 5 Drawing Sheets

(51) Int. Cl.
  *H01M 2/36*       (2006.01)
  *H01M 2/16*       (2006.01)
  *H01M 10/0585*    (2010.01)
  *H01M 50/20*      (2021.01)
  *H01M 50/24*      (2021.01)
  *H01M 50/209*     (2021.01)
  *H01M 50/46*      (2021.01)
  *H01M 50/636*     (2021.01)

(52) U.S. Cl.
  CPC ......... *H01M 50/20* (2021.01); *H01M 50/209* (2021.01); *H01M 50/24* (2021.01); *H01M 50/461* (2021.01); *H01M 50/636* (2021.01); *H01M 2220/20* (2013.01)

(58) Field of Classification Search
  CPC ... H01M 2/1094; H01M 2/168; H01M 2/1061
  See application file for complete search history.

(56) References Cited

FOREIGN PATENT DOCUMENTS

| | | | |
|---|---|---|---|
| GB | 2302202 | A | 1/1997 |
| JP | S6412472 | A | 1/1989 |
| JP | H063748 | B2 | 1/1994 |
| JP | 2001351594 | A | 12/2001 |
| JP | 2012216589 | A | 11/2012 |
| JP | 2014116239 | A | 6/2014 |
| JP | 5565198 | B2 | 8/2014 |
| KR | 100719720 | B1 | 5/2007 |
| KR | 20080051982 | A | 6/2008 |
| KR | 101541772 | B1 | 8/2015 |
| KR | 20150099896 | A | 9/2015 |
| KR | 20160105354 | A | 9/2016 |
| WO | 2016137303 | A1 | 9/2016 |

OTHER PUBLICATIONS

International Search Report for Application No. PCT/KR2018/007749, dated Oct. 12, 2018, pp. 1-2.
Extended European Search Report with Written Opinion for Application No. 18832519.5 dated Jul. 21, 2020, 13 pages.

\* cited by examiner

[Figure 1]
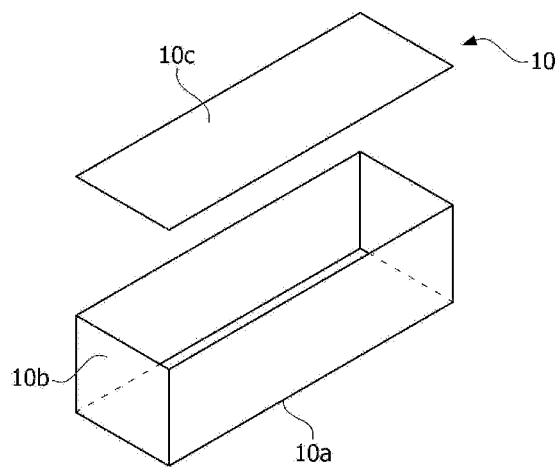
[Figure 2]
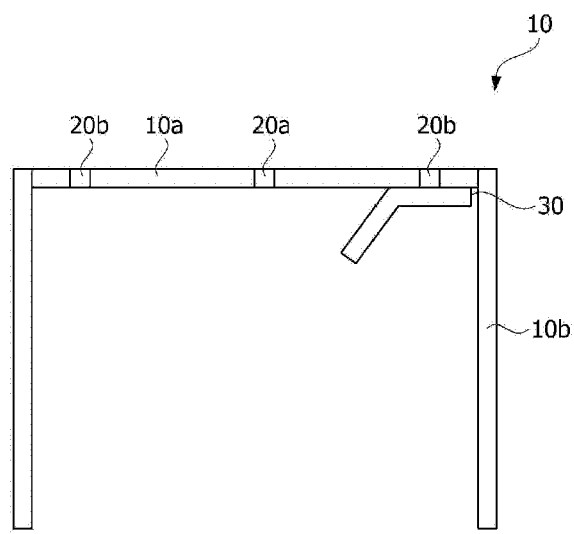

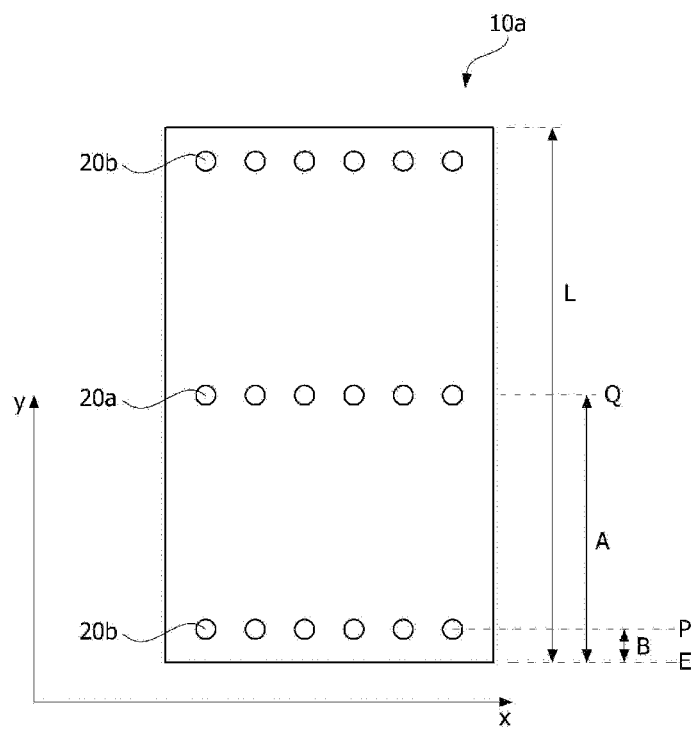
[Figure 4]
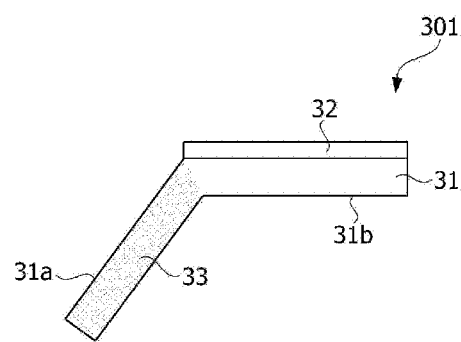

[Figure 5]
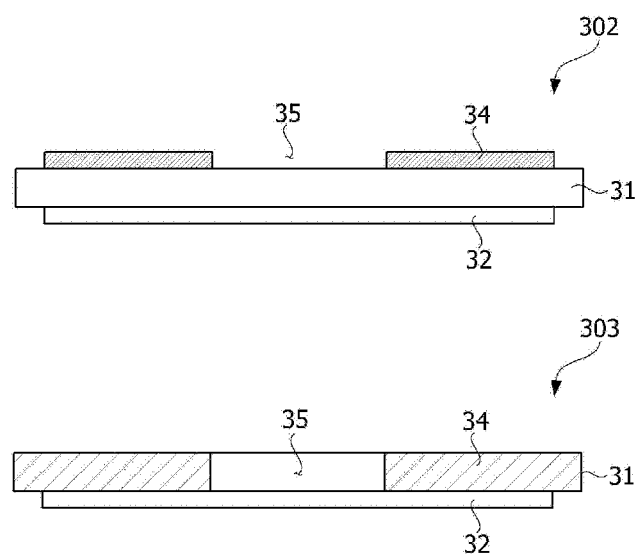
[Figure 6]
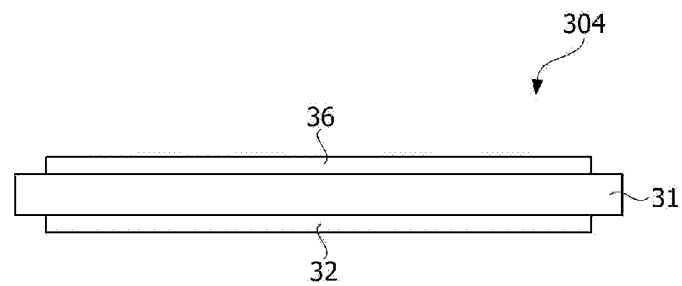

[Figure 7]
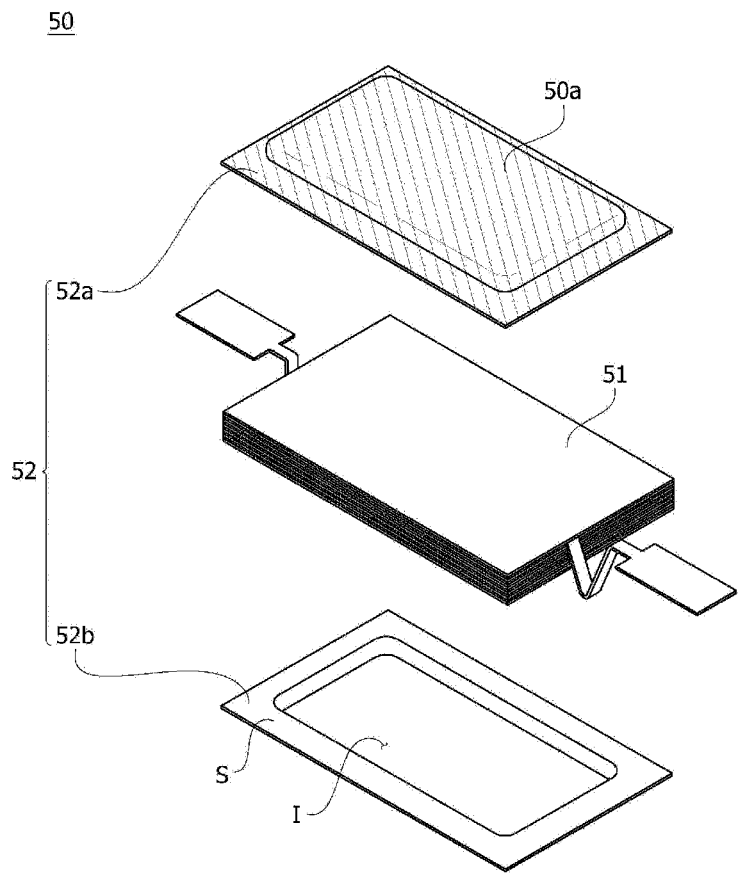
[Figure 8]
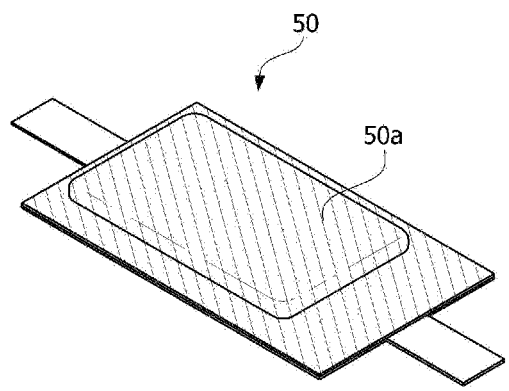

[Figure 9]
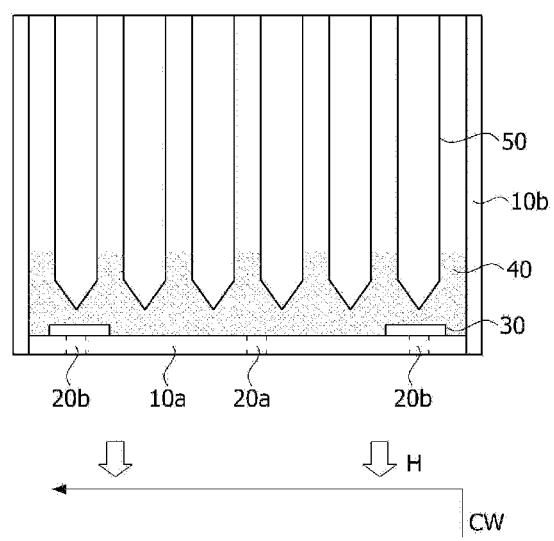

BATTERY MODULE CASE AND BATTERY MODULE COMPRISING THE SAME

CROSS-REFERENCE TO RELATED APPLICATIONS

This application is a national phase entry under 35 U.S.C. § 371 of International Patent Application No. PCT/KR2018/007749, filed on Jul. 9, 2018, published in Korean, which claims priority from Korean Patent Application No. 10-2017-0087121, filed on Jul. 10, 2017, the disclosures of which are hereby incorporated herein by reference in their entireties.

TECHNICAL FIELD

The present application relates to a battery module case, a battery module comprising the same, a battery pack comprising such a battery module, and a vehicle comprising such a battery module or pack.

BACKGROUND ART

A secondary battery includes a nickel cadmium battery, a nickel hydride battery, a nickel zinc battery or a lithium secondary battery, and the like, where a typical example thereof is a lithium secondary battery and a lithium oxide and a carbon material are mainly used as a positive electrode active material and a negative electrode active material, respectively.

The secondary battery includes an electrode assembly in which a positive electrode plate and a negative electrode plate each coated with a positive electrode active material and a negative electrode active material are disposed with a separator interposed therebetween, and an exterior material for hermetically accommodating the electrode assembly together with an electrolyte. Depending on the shape of the exterior material, the secondary battery can be classified into a can type and a pouch type.

In recent years, secondary batteries have been widely used not only in small devices such as portable electronic devices, but also in medium and large systems such as automobiles or electric power storage systems.

When used in such medium and large systems, a large number of secondary batteries are electrically connected to increase capacity and power. Particularly, the pouch type secondary battery is widely used because of its advantages such as small weight, low manufacturing cost and easy shape deformation.

However, the pouch type secondary battery generally does not have a large mechanical rigidity, and the battery itself does not include a structure for joining the batteries to each other, so that stacking is difficult. Accordingly, when a battery module including many pouch type secondary batteries is constructed, a coupling member configuration, such as a separate cartridge, for protecting a secondary battery laminate from external impact or the like, preventing the flow thereof and facilitating stacking is required.

Conventionally, when a battery module is constructed, an overlap design of a secondary battery body portion is applied or a method of applying a surface pressure to a large area part of a body portion, a method of fixing a electrode terminal of a secondary battery and a bus bar by laser welding or the like is applied to secure a plurality of secondary batteries in the inner space of the battery module. According to such a conventional battery module configuration, when an external vibration has been applied, there is a problem that the body portion of the secondary battery is not only shaken but also the mechanical impact is directly transmitted to the electrode tab drawn out from the electrode assembly and the electrode lead connected thereto, thereby affecting an electrical connection state. In order to solve this problem, the resin composition may be injected into the battery module and then cured to minimize the influence of the external vibration.

However, since internal volumes differ for each module due to tolerances between the battery module case and the secondary battery and between the secondary batteries in the above method, there is a problem that the injection amount of the resin composition injected into the battery module case must be manually controlled for each battery module.

Therefore, a measure capable of providing a battery module case applicable to an automation process, a battery module comprising the same, a battery pack comprising such a battery module and a vehicle comprising such a battery module or pack is requested.

DISCLOSURE

Technical Problem

The present application can provide a battery module case applicable to an automation process, a battery module comprising the same, a battery pack comprising such a battery module and an automobile comprising such a battery module or pack.

Technical Solution

In one example of the present application, the present application relates to a battery module case used in a battery module.

FIG. 1 is a perspective view showing an exemplary battery module case (10) in the form of a box including one bottom plate (10a) and four sidewalls (10b). The battery module case forms an inner space by the bottom plate (10a) and the four sidewalls (10b), where the inner space can accommodate a resin layer and a plurality of battery cells. The battery module case (10) may further comprise a top plate (10c) for sealing the inner space. The terms "top plate" and "bottom plate" may be used interchangeably in accordance with the reference direction.

The battery module case of the present application may be formed by integrated bottom plate and sidewalls, or may be formed by assembling a bottom plate, sidewalls and/or a top plate, which are separated, respectively. The shape and size of such a module case are not particularly limited, which can be appropriately selected depending on the use of the module case, the shape and number of battery cells housed in the internal space, and the like. The bottom plate (10a), the sidewall (10b) or the top plate (10c) is formed of, for example, a metal material such as stainless steel and thus has light opacity, which does not transmit light. The light opacity means that the transmittance of light having an arbitrary wavelength is about 10% or less, 5% or less, 3% or less, or about 1% or less.

FIG. 2 is a sectional view of an exemplary battery module case (10) comprising a bottom plate (10a), sidewalls (10b), control holes (20b) formed in the bottom plate, an injection hole (20a) formed in the bottom plate, and a light transmissive film (30) located on the control hole (20b).

In the present application, the bottom plate, the sidewall and/or the top plate (hereinafter, may be referred to as the bottom plate or the like) of the battery module case has a control hole (20b). At this time, the shape, number and position of the control hole can be adjusted in consideration of the kind of the resin composition, the injection amount, the formation position of the injection hole or the control efficiency, and the like.

When the resin composition is insufficiently injected into the battery module, the resin layer is formed to be thin, and thus defects can easily occur in the electrical connection state between the battery cells due to the external vibration, so that the stability of the battery module is degraded. Also, when the resin composition is excessively injected, the resin composition may be discharged to deteriorate quality and productivity of the battery module.

In one embodiment, the control hole (transmissive hole or light transmissive hole) of the battery module case may be formed through the bottom plate or the like, which has light opacity, and light of any wavelength may be transmitted through the control hole. Therefore, an observer, a detector or an observing instrument can observe the resin composition injected into the battery module case through the transmissive hole, so that the injection amount of the resin composition can be easily confirmed.

The battery module case (10) comprises a light transmissive film (30). The type, shape, number and position of the light transmissive film can be adjusted in consideration of the control hole. In one example, the light transmissive film may be located on the control hole. In this specification, the fact that the light transmissive film is located on the control hole may mean that the light transmissive film is attached to the position of the control hole or formed on the control hole. In one example, the light transmissive film may be formed to cover the control hole beyond the size of the control hole formed on the bottom plate or the like, or may also be formed to match the size of the control hole. Meanwhile, the light transmissive film may be located on the outer surface, the inner surface or both surfaces of the control hole. The attachment surface of the light transmissive film can be appropriately adjusted according to the type of the light transmissive film to be described below.

The light transmissive film transmits the light transmitted through the control hole (or transmissive hole). Therefore, the observer, the detector, or the observing instrument can easily observe the injection amount of the resin composition because the resin composition injected into the battery module case can be observed through the transmissive hole and the light transmissive film. Accordingly, even if the tolerances that may occur in the internal space vary depending on different sizes and arrangements of the plurality of battery cells for each battery module, the light transmissive film enables injection of a predetermined amount of the resin composition, and allows that the battery module can be mass-produced by an automation process.

The method of confirming the injection amount of the resin composition is not particularly limited and it can be confirmed by a direct method or an indirect method. The meaning which is confirmed by a direct method may mean confirming the injection amount of the resin composition by the resin composition injected into the battery module. In one example, the detector or the observing instrument can receive the light reflected by the resin composition injected into the battery module to confirm the injection amount of the resin composition. Meanwhile, the meaning which is confirmed by an indirect method may mean confirming the injection amount of the resin composition by an element other than the resin composition injected into the battery module. In one example, the detector or the observing instrument can confirm the injection amount of the resin composition by observing a detectable component of the light transmissive film.

As used herein, the term "light transmissive" is a term in contrast to the light opacity, which means that the transmittance of light having any wavelength is about 60% or more, 70% or more, 80% or more, or about 90% or more. Here, any wavelength may include, for example, a wavelength of about 1 nm to about 1 mm, and the light can mean ultraviolet, visible, infrared or very high frequency light, and more specifically, can include laser light.

Furthermore, the light transmissive film of the present application transmits light passing through the control hole, but can prevent entry and exit of a substance through the control hole. That is, since the light transmissive film is attached to the position of the control hole or formed on the control hole, it can prevent the resin composition from flowing out to the outer space of the battery module case through the control hole. Since the resin composition is a fluid having a predetermined viscosity before being cured, it can continue to flow due to inertia even after the observer confirms that the resin composition has been injected to the control hole. In this case, a part of the resin composition may flow out to the outside through the control hole, resulting in a defective product. The light transmissive film may also prevent foreign substances such as dust from being injected into the inner space of the battery module case through the control hole in the process.

Meanwhile, a hole may be formed in the bottom plate or the like of the battery module case in addition to the control hole. The hole may be a through hole (or an injection hole) formed through the bottom plate or the like and capable of injecting the resin composition. At this time, the shape, number and position of the injection hole can be adjusted in consideration of injection efficiency of the resin composition.

The battery module case may be a thermally conductive case. The term thermally conductive case means a case that the entire case has thermal conductivity of 10 W/mk or more, or which has a thermally conductive region having at least the thermal conductivity as above. For example, at least one of the sidewalls, the bottom plate and the top plate as described above may have the thermally conductive region. In another example, the bottom plate and the sidewall may comprise the thermally conductive region at a portion in contact with the resin layer. Here, in another example, the thermal conductivity may be about 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of a heat dissipation property of the module, and thus the upper limit is not particularly limited. In one example, the thermal conductivity may be about 1,000 W/mK or less, 900 W/mk or less, 800 W/mk or less, 700 W/mk or less, 600 W/mk or less, 500 W/mk or less, 400 W/mk or less, 300 W/mk or less, or about 250 W/mk or less, but is not limited thereto. The kind of materials exhibiting the thermal conductivity as above is not particularly limited, and for example, there is a metal material such as iron, aluminum, gold, silver, tungsten, copper, nickel, platinum or an alloy comprising them.

In addition, the thermally conductive region may be a portion in contact with a cooling medium such as cooling water. According to this structure, a structure capable of effectively releasing the heat generated from the battery cell into the outside can be realized.

Meanwhile, among physical properties mentioned in this specification, when the measured temperature affects the physical properties, the physical properties may be physical properties measured at room temperature, unless otherwise specified. The term room temperature herein may mean any temperature in a range of about 10° C. to about 30° C., for example, a temperature of about 25° C., 23° C. or about 20° C. or so.

FIG. 3 is a plan view of an exemplary bottom plate in which injection holes (20a) and control holes (20b) are formed.

In the battery module case of the present application, the injection holes (20a) may be formed in the sidewall, the bottom plate or the top plate. The position (Q) of the injection holes may be formed at about 1/4 to about 3/4 point or about 3/8 to about 7/8 point of the entire length of the bottom plate or the like or about the middle portion. By injecting the resin composition through the injection holes formed at the point, injection time of the resin composition can be shortened and the resin composition can be evenly injected into the battery module. In an embodiment, the resin injected through the injection holes (20a) is injected along the y axis which is the injection (or movement) direction of the resin.

The about 1/4, 3/4, 3/8 or about 7/8 point is the ratio of the distance (A) to the formation position of the injection hole, relative to the total length (L) of the bottom plate or the like, as measured based on any one end surface (E) of the bottom plate or the like. Here, the end at which the length (L) and the distance (A) are formed may also be any end, as long as the length (L) and the distance (A) are measured from the same end.

Meanwhile, in the battery module case of the present application, the control hole (20b) may be formed on the bottom plate or the sidewall. The position (P) of the control hole may be formed at a point satisfying Equation 1 below.

$$1/50 \leq P = B/L \leq 1/2 \quad \text{[Equation 1]}$$

In Equation 1 above, P represents the position of the control hole formed on the bottom plate or the sidewall, L represents the total length of the bottom plate or the sidewall as measured based on any one end surface (E) of the bottom plate or the sidewall, and B represents the distance to the control hole based on the end surface.

That is, the 1/50 to 1/2 point is the ratio of the distance (B) to the formation position of the control hole, relative to the total length (L) of the bottom plate or the sidewall, as measured based on any one end surface of the bottom plate or the sidewall. Here, the end at which the length (L) and the distance (B) are formed may be any end, as long as the length (L) and the distance (B) are measured from the same end.

The position (P) of the control hole may be formed considering the position (Q) of the injection hole, which may be formed at about 1/50, 1/40, 1/30, 1/20 or about 1/10 point to about 1/5, 1/4, 1/3 or about 1/2 point. For example, when the position of the injection hole is formed at about 1/2 point, the position of the control hole may be formed at about 1/50 point. Also, when the position of the injection hole is formed at about 7/8 point, the position of the control hole may be formed at about 1/8 point. Furthermore, when the position of the injection hole is formed at about 1/8 and about 7/8 points, the position of the control hole may be formed at about 1/2 point. As above, when the formation position (P) of the control hole satisfies Equation 1, the proper amount of the injected resin can be precisely controlled.

The formation position of the control hole can be formed as far as possible from the formation position of the injection hole in the bottom plate or the like. However, the position of the control hole can be adjusted in consideration of the kind of the resin composition, injection amount, control efficiency, and the like. By forming the control hole at the point, the injection amount of the resin composition injected through the injection hole can be checked efficiently.

In one example, a plurality of control holes may be arranged and formed in any direction. Specifically, the plurality of control holes may be arranged along the x-axis which is a direction perpendicular to the movement direction (y-axis) of the resin as described above. As used herein, the term "perpendicular" does not mean only the perpendicular of the mathematical sense. For example, the "perpendicular" means that the angle formed by the y-axis and the x-axis is about 70° to about 120°, about 80° to about 110° or about 85° to about 105°.

The shape, arrangement, and material of the light transmissive film in the battery module case of the present application are not particularly limited as long as it is a means capable of transmitting light of any wavelength from the outside to the inner space through the control hole.

With respect to the arrangement of the light transmissive film, for example, when one or more control holes are provided, a separate light transmissive film corresponding to each control hole can be formed, and one light transmissive film covering all of the one or more control holes can also be formed.

That is, in one embodiment, when the plurality of control holes are arranged and formed in any direction, one light transmissive film may be formed extending along the arrangement direction of the control holes. Specifically, when the plurality of control holes are arranged along the x-axis which is a direction perpendicular to the movement direction (y-axis) of the resin as described above, one light transmissive film may be formed extending along the x-axis. In this case, the light transmissive film may serve as a dam or a stopper for preventing the resin composition from moving in the y-axis direction beyond the control hole.

The light transmissive film (30) may comprise a base material and an adhesive layer formed on the base material, where the base material and the adhesive layer each have light transmittance.

The base material is in the form of a polymer film having flexibility and durability, which may be selected from materials having a high tensile strength. For example, the base material may include one or more selected from the group consisting of polyolefins such as polyethylene or polypropylene, polyesters such as polyethylene terephthalate or polybutylene terephthalate, polyvinyl chloride, polystyrene, polyurethane, polycarbonate, polyamide, polyimide, poly (meth)acryl acid, polybutene and polybutadiene, but is not limited thereto.

The adhesive layer formed on the base material may comprise a substance having adhesiveness such that the base material is bonded to the battery module case. For example, the adhesive layer may be formed by applying an acrylic adhesive, a polyester adhesive, a polyurethane adhesive, a rubber adhesive, a silicone adhesive or an epoxy adhesive onto a base material, or may be in the form that a bonding film formed from the adhesive is attached on a base material.

The adhesive layer may be attached to the position of the control hole. The fact to be attached to the position of the control hole may mean that the adhesive layer is attached to the place where the control hole formed in the bottom plate is located, and the adhesive layer may be attached to at least one place of the outer surface or the inner surface of the bottom plate, where the adhesive layer may be attached in the form of covering the control hole or attached to the peripheral portion of the control hole. The adhesion surface of the adhesive layer can be appropriately adjusted depending on the type of the light transmissive film to be described below.

In one example of the present application, the adhesive layer may have haze of about 60% or less. The haze may be 55% or less, 50% or less, 45% or less, 40% or less, 35% or less, or 30% or less, and may be about 5% or more, 10% or more, or 15% or more. When the haze of the adhesive layer satisfies the above range, reflection of light from the surface of the base material can be suppressed, and errors in the detector due to light reflection can be reduced, thereby lowering the defective rate upon application of the automation process. Furthermore, when the haze of the adhesive layer satisfies the above range, reflection of light from the surface of the battery module case can also be prevented.

The light transmissive film may further comprise a detection means and an antireflection means, and the like.

FIG. 4 exemplarily shows a light transmissive film having a detection means. In this example, the light transmissive film (301) is composed of a base material (31) and an adhesive layer (32) formed in a partial region on the base material. The base material is divided into a partial region (31b) that the adhesive layer (32) is formed and the other region (31a) that the adhesive layer (32) is not formed, where the adhesive layer (32) can be attached to the inner surface of the control hole. The partial region (31b) and the other region (31a) may be bent at a predetermined angle. The partial region (31b) and the other region (31a) may have different optical characteristics. For example, the partial region (31b) may have colorless transparent optical characteristics and the other region (31a) may have color optical characteristics, by including a detectable component (33).

When the light transmissive film (301) is in contact with the control hole through the transparent adhesive layer (32), an observer, a detector or an observing instrument can observe the inside of the battery module case from the outside through the transparent adhesive layer (32) and the partial region (31b) having colorless transparent optical characteristics, before the resin composition is injected. When the resin composition is injected, it can further cover the control hole, because the other region (31a) of the base material is bent in the direction of the partial region (31b). In this case, the observer, the detector or the observing instrument can observe the detectable component (33) included in the partial region (31b), whereby the injection of the resin composition can manually or automatically be stopped.

The component detectable by the detector or the like is not particularly limited as long as it is an optically detectable component. In one example, a pigment or dye component and the like may be used as a detectable component.

The fact that the base material comprises a detectable component means that the detectable component is included as one component forming the base material or the detectable component is formed on the base material. As a method of forming a detectable component on a base material, a known method such as impregnating a base material with a detectable component to form it or coating a detectable component on a base material to form it can be used.

FIG. 5 is another example of a light transmissive film (302, 303) in which the base material comprises an absorbent component (34) that absorbs light of any wavelength. The light transmissive film (302) is composed of a base material (31) and an adhesive layer (32) formed on the base material (31), where in the opposite side of the base material (31) on which the adhesive layer is formed, a light absorbing component (34) is formed on the base material. In another example, the light transmissive film (303) is composed of a base material (31) and an adhesive layer (32) formed on the base material (31), where a light absorbing component (34) is included as one component forming the base material. The adhesive layer (32) of the light transmissive film (302, 303) may be attached to one or more positions of the outer surface or the inner surface of the control hole.

Meanwhile, light of any wavelength may be irradiated to the inner space through the control hole into a region (35) of the base material in which the light absorbing component (34) is not included. In this case, various lights may be reflected around the control hole by the surface of the metallic battery module case, and such light reflection may degrade detection accuracy of the light passing through the control hole. Therefore, when the light absorbing component (34) is included in a partial region where the base material does not cover the control hole or the peripheral region of the control hole, the detection accuracy of light passing through the control hole can be increased by preventing light from being reflected on the battery case surface.

The light of any wavelength is not particularly limited as long as it is one which can be irradiated by a light irradiator and that at least a part of the irradiated light can be received, such as infrared rays, visible rays or ultraviolet rays, and for example, a laser can be used.

The absorbent component is not particularly limited as long as it is an absorbent component having a function of preventing light reflection, which may be an absorbent component capable of absorbing various lights including light irradiated from a light irradiator. For example, a pigment or dye component and the like may be used as an absorbent component.

The fact that comprises an absorbent component that absorbs light of any wavelength in the base material means that the absorbent component is included as one component forming the base material or the absorbent component is formed on the base material. As a method of forming an absorbent component on a base material, a known method such as impregnating a base material with an absorbent component to form it or coating an absorbent component on a base material to form it can be used.

FIG. 6 is another example of a light transmissive film (304) that an antireflection film (36) as an antireflection means is formed on a base material. In FIG. 6 above, the light transmissive film (304) may be composed of a base material, an adhesive layer (32) formed on a partial region or the entire region of the base material, and an antireflection film (34) formed on the opposite side of the base material on which the adhesive layer is formed. Meanwhile, the adhesive layer (32) of the light transmissive film (304) may be attached to one or more positions of the outer surface or the inner surface of the control hole.

It is possible to prevent light from being reflected from the surface of the battery case by the antireflection film, thereby increasing detection accuracy of light passing through the control hole.

The antireflection film means a film that helps light to be transmitted or absorbed at an interface between two media having different refractive indexes without being reflected. As a method of forming the antireflection film, a sputtering process may be used, without being limited thereto, and it may be formed with a known method. The antireflection film may be formed on the entire or partial region of the base material.

The present application also relates to a battery module.

The battery module of the present application comprises a battery module case including a bottom plate, sidewalls, a control hole formed in the bottom plate or the sidewall, and a light transmissive film located on the control hole; a battery cell; and a resin layer.

In an embodiment, the bottom plate or the sidewall of the battery module case may further comprise an injection hole. Through the injection hole, a resin composition for forming a resin layer of the bottom plate or the sidewall is injected.

The battery module case included in the battery module of the present application is the same as the battery module case of the present application, and thus a detailed description thereof will be omitted.

The battery module of the present application further comprises a battery cell. In the present application, the term battery cell means one unit secondary battery constituted by comprising an electrode assembly and an exterior material.

FIG. 7 is an exploded perspective view schematically showing a configuration of an exemplary pouch type battery cell, and FIG. 8 is an assembled perspective view of the pouch type battery cell of FIG. 7.

The type of the battery cell housed in the battery module case is not particularly limited, and various known battery cells may all be applied. In one example, the battery cell may be a pouch shape. The pouch type battery cell (50) may typically comprise an electrode assembly (51) and a pouch exterior material (52).

The electrode assembly (51) included in the pouch type battery cell (50) may be in a form that one or more positive plates and one or more negative plates are disposed with a separator interposed therebetween. The electrode assembly (51) may be divided into a wound type that one positive electrode plate and one negative electrode plate are wound together with a separator or a stacked type that a number of positive electrode plates and a number of negative electrode plates are alternately stacked with a separator interposed therebetween, and the like.

The pouch exterior material (52) may be composed of a form equipped with, for example, an external insulating layer, a metal layer and an internal adhesive layer. Such an exterior material (52) protects internal elements such as the electrode assembly (51). The metal layer in the exterior material (52) may comprise a metal thin film of aluminum or the like in consideration of complementarity of the electrode assembly (51) to the electrochemical property by the electrolyte and a heat dissipation property, and the like. Such a metal thin film may be interposed between insulating layers formed of an insulating material to secure electrical insulation.

In one example, the exterior material (52) may comprise an upper pouch (52a) and a lower pouch (52b), where a concave inner space (I) may be formed in at least one of the upper pouch (52a) and the lower pouch (52b). The electrode assembly (51) can be housed in such an inner space (I) of the pouch. Sealing parts (S) are provided on the outer circumferential surfaces of the upper pouch (52a) and the lower pouch (52b) and these sealing parts (S) are bonded to each other, so that the inner space, in which the electrode assembly (51) is accommodated, can be sealed.

Each electrode plate of the electrode assembly (51) is provided with an electrode tab, where one or more electrode tabs may be connected to the electrode lead. The electrode lead is interposed between the sealing parts (S) of the upper pouch (52a) and the lower pouch (52b) and is exposed to the outside of the exterior material (52), whereby it can function as an electrode terminal of the battery cell (50).

Here, the surface of the battery cell, for example the pouch exterior material (52), may comprise an absorbent component (50a) that absorbs light of any wavelength. The light of any wavelength is not particularly limited as long as it is one, such as infrared rays, visible rays or ultraviolet rays, which can be irradiated by a light irradiator and that at least a part of the irradiated light can be received, and for example, a laser can be used.

The absorbent component is not particularly limited as long as it is an absorbent component having a function of preventing light reflection, which may be an absorbent component capable of absorbing the reflected light that the light irradiated by a light irradiator is reflected by the surface of the battery cell. For example, a pigment or dye component or the like may be used as an absorbent component.

The light passing through the control hole can be reflected by the surface of the battery cell composed of a metallic material such as aluminum, which serves to degrade detection accuracy of light. The light absorbing component contained in the pouch exterior material prevents light from being reflected from the surface of the battery cell, whereby the detection accuracy of the detector can be increased.

The absorbent component may be included on all or some of the surfaces of the pouch exterior material. The fact that an absorbent component absorbing light of any wavelength is included on all or some of the surfaces of the pouch exterior material means that the absorbent component is included as one component forming the surface of the pouch exterior material, the absorbent component is formed on the pouch exterior material, or an adhesive tape comprising an absorbent component that absorbs light of any wavelength is attached onto the pouch exterior material. It can be formed by a known method, as a method of forming an absorbent component on a pouch exterior material, such as impregnating the pouch exterior material with an absorbent component or coating an absorbent component on the pouch exterior material.

The shape of the pouch type cell is one example, and the battery cell applied in the present application is not limited to the same kind as above. In the present application, various types of known pouch type cells or other types of cells can be all applied as the battery cell.

The battery module of the present application comprises a resin layer. In the present application, the term resin layer is a layer containing a resin component, and in one example, the resin layer may also be an adhesive layer.

FIG. 9 is an exemplary sectional view of the battery module, and for example, the module may be in a form which comprises a battery module case including sidewalls (10b) and a bottom plate (10a) on which an injection hole (20a) and control holes (20b) are formed; a plurality of battery cells (50) accommodated inside the case; and a resin layer (40) contacting both the battery cells (50) and the case. In the above structure, the bottom plate or the like in contact with the resin layer (40) may have a thermally conductive region.

Here, the contact means thermal contact, which may mean a state where the resin layer is in direct contact with the bottom plate or the like, or another element between the resin layer and the bottom plate or the like, for example, an insulating layer or the like to be described below, is present, but the another element does not interfere with transmission of heat from the resin layer to the bottom plate or the like. Here, the fact that does not interfere with transmission of heat means the case that even when another element (e.g., an insulating layer) is present between the resin layer and the bottom plate or the like, the total thermal conductivity of the another element and the resin layer is about 1.5 W/mK or more, 2 W/mK or more, 2.5 W/mK or more, 3 W/mK or more, 3.5 W/mK or more, or about 4 W/mK or more, or even when the another element is present, the total thermal conductivity of the resin layer and the bottom plate or the like in contact with the layer is included in the above range. The thermal conductivity of the thermal contact may be about 50 W/mk or less, 45 W/mk or less, 40 W/mk or less, 35 W/mk or less, 30 W/mk or less, 25 W/mk or less, 20 W/mk or less, 15 W/mk or less, 10 W/mK or less, 5 W/mK or less, 4.5 W/mK or less, or about 4.0 W/mK or less. This thermal contact can be achieved by controlling the thermal conductivity and/or the thickness of the other element when the other element is present.

The resin layer may also be in contact with the battery cell. The contact between the battery cell and the resin layer is also the above-described thermal contact. Through adoption of such a structure, the present application can realize a module that more battery cells per unit volume are accommodated by securing heat dissipation characteristics while greatly reducing various fastening parts or module cooling equipment, and the like conventionally required upon constructing a general battery module or a battery pack as an assembly of such modules. Accordingly, the present application can provide a battery module having higher power while being smaller and lighter.

The contact area between the resin layer and the bottom plate or the like may be about 70% or more, 75% or more, 80% or more, 85% or more, 90% or more, or about 95% or more, relative to the total area of the bottom plate or the like. The upper limit of the contact area is not particularly limited, which may be, for example, about 100% or less or less than about 100%.

When the bottom plate or the like includes a thermally conductive portion, the contact area may be a contact area with respect to the thermally conductive portion, that is, a ratio relative to the total area of the thermally conductive portion.

The bottom plate or the like having the thermally conductive region may be a portion in contact with a cooling medium such as cooling water. That is, as schematically shown in FIG. 9, the heat (H) can be easily discharged to the bottom plate or the like by such a structure, and the release of heat can be easily performed even in a simpler structure by contacting such a bottom plate or the like with the cooling medium (CW).

The resin layer may be, for example, in a range of about 100 μm to about 5 mm, or in a range of about 200 μm to about 5 mm. In the structure of the present application, if the resin layer is thin, it is advantageous in terms of heat dissipation characteristics, and if it is thick, it is advantageous in the insulating property to be described below, and thus the appropriate thickness can be set in consideration of this point. The thickness may be a thickness of the thinnest portion of the resin layer, a thickness of the thickest portion or an average thickness.

The material for forming the resin layer, that is, the resin composition may be an adhesive material, which may also be a solvent type, an aqueous type or a solventless type. In addition, the resin composition may be an active energy ray curable type, a moisture curable type, a thermosetting type or a room temperature curable type, and the like.

The resin layer may comprise a filler in consideration of thermal conductivity, insulation, heat resistance (TGA analysis) or specific gravity, and the like. Through use of an appropriate filler, the thermal conductivity in the above-mentioned range or the like can be secured. In one example, the filler may be a thermally conductive filler. In the present application, the term thermally conductive filler means a filler having thermal conductivity of about 1 W/mK or more, 5 W/mK or more, 10 W/mK or more, or about 15 W/mK or more. The thermal conductivity of the thermally conductive filler may be about 400 W/mK or less, 350 W/mK or less, or about 300 W/mK or less. The kind of the usable thermally conductive filler is not particularly limited, but a ceramic filler may be applied in consideration of the insulating property and the like. For example, ceramic particles such as alumina, MN (aluminum nitride), BN (boron nitride), silicon nitride, SiC, ZnO or BeO may be used. In addition, if the insulating properties of the resin layer can be ensured, application of a carbon filler such as graphite may also be considered.

The shape or ratio of the filler contained in the resin layer is not particularly limited, which may be selected in consideration of viscosity of the resin composition, possibility of settling in the resin layer, the desired heat resistance or thermal conductivity, insulation, a filling effect or dispersion, and the like. Generally, the larger the size of the filler, the higher the viscosity of the resin composition and the higher the possibility that the filler precipitates in the resin layer. Furthermore, the smaller the size, the thermal resistance tends to be increased. Therefore, an appropriate type of filler may be selected in consideration of the above points, and two or more fillers may also be used, if necessary. Considering the filling amount, it is advantageous to use a spherical filler, but considering network formation or conductivity, a filler in a form such as needle-like morphology or flattened morphology may also be used. In one example, the resin layer may comprise a thermally conductive filler having an average particle diameter in a range of about 0.001 μm to about 80 μm. In another example, the average particle diameter of the filler may be about 0.01 μm or more, 0.1 or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

The ratio of the filler contained in the resin layer can be selected in consideration of the characteristics of the resin layer. For example, the filler may be contained in a range of about 50 to about 2,000 parts by weight relative to 100 parts by weight of the resin component in the resin layer. In another example, the part by weight of the filler may be about 100 parts by weight or more, 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more.

The resin layer may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force. The resin layer may comprise any one or two or more of the above components.

In one example, the battery module of the present application may further comprise an insulating layer between the battery module case and the battery cell or between the resin layer and the battery module case. By adding an insulating layer, it is possible to prevent problems such as an electrical short phenomenon or a fire due to a contact between the cell and the case according to an impact that may occur during use. The insulating layer may be formed using an insulating sheet having high insulation and thermal conductivity, or may be formed by applying or injecting a material exhibiting insulating properties. For example, in the method of manufacturing a battery module as described below, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, 10 kV/mm or more, 15 kV/mm or more, 20 kV/mm or more, 25 kV/mm or more, or 30 kV/mm or more. The higher the value of the insulation breakdown voltage is, the better the insulation shows, and thus it is not particularly limited. For example, the insulation breakdown voltage of the insulating layer may be about 100 kV/mm or less, 90 kV/mm or less, 80 kV/mm or less, 70 kV/mm or less, or 60 kV/mm or less. The thickness of the insulating layer can be set to an appropriate range in consideration of the insulating property and the thermal conductivity of the insulating layer, and the like, and for example, may be about 5 μm or more, 10 μm or more, 20 μm or more, 30 μm or more, 40 μm or more, 50 μm or more, 60 μm or more, 70 μm or more, 80 μm or more, or about 90 μm or more or so. In addition, the upper limit of the thickness is not particularly limited and may be, for example, about 1 mm or less, 200 μm or less, 190 μm or less, 180 μm or less, 170 μm or less, 160 μm or less, or about 150 μm or less.

The present application also relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, where all applications requiring secondary batteries as power may be included. For example, a method of configuring the automobile using the battery module or the battery pack is not particularly limited, and a general method can be applied.

Advantageous Effects

The battery module case of the present application can easily check the injection amount of the resin composition by being provided with a light transmissive film even if the tolerances generated inside the battery module vary for each battery module, and allows that the battery module can be mass-produced by an automation process. In addition, the module case of the present application can prevent the resin composition from overflowing through the control hole by being provided with a light transmissive film.

Furthermore, the battery module of the present application can be mass-produced by an automation process, thereby reducing the production cost and shortening the production time. In addition, the battery module of the present application can accommodate a large number of battery cells per unit volume, thereby being produced in a small size and generating high power with a light weight.

BRIEF DESCRIPTION OF DRAWINGS

FIG. 1 is a perspective view showing an exemplary battery module case of the present application.

FIG. 2 is a sectional view of an exemplary battery module case that an injection hole, control holes and a light transmissive film are formed on a bottom plate.

FIG. 3 is a plan view of an exemplary bottom plate in which injection holes and control holes are formed.

FIG. 4 is a sectional view showing a light transmissive film having a detection means.

FIG. 5 is a sectional view showing an exemplary light transmissive film that an absorbent component that absorbs light is included in a base material.

FIG. 6 is a sectional view showing another exemplary light transmissive film that an antireflection film is formed on a base material.

FIGS. 7 and 8 are perspective views showing an exemplary battery pouch that can be used as a battery cell.

FIG. 9 is a sectional view showing a structure of an exemplary battery module.

MODE FOR INVENTION

Hereinafter, Example and Comparative Examples will be described, but the scope of the present application is not limited by the range shown below.

Evaluation Method

Processability

A case where the injection amount of the resin composition injected into the battery module case could not be confirmed from the outside or a case where the resin composition injected into the battery module case was discharged through the control hole was evaluated that the processability suitable for an automation process was not ensured.

<Evaluation Results>

O: if it is suitable for automation process application

X: if it is not suitable for automation process application

EXAMPLE

A plurality of battery cells were accommodated in a battery module case that an injection hole and a control hole were formed in a bottom plate and a light transmissive film was attached to the control hole. After attaching the light transmissive film, a resin composition was injected into the battery module case through the injection hole.

Comparative Example 1

A plurality of battery cells were accommodated in a battery module case that an injection hole was formed in a bottom plate and a resin composition was injected into the battery module case through the injection hole.

Comparative Example 2

A plurality of battery cells were accommodated in a battery module case that an injection hole and a control hole were formed in a bottom plate and a resin composition was injected into the battery module case through the injection hole.

TABLE 1

| | Processability | |
|---|---|---|
| | Checking injection amount | Reverse-discharge of resin composition |
| Example | ○ | X |
| Comparative Example 1 | X | X |
| Comparative Example 2 | ○ | ○ |

It can be confirmed from Table 1 above that the battery module case is suitable for the automation process of the battery module. Specifically, when a battery module is manufactured by applying the battery module case to which the light transmissive film of the embodiment is applied, the injection amount of the resin composition can be easily confirmed, and the resin composition can also be prevented from being reversely discharged through the control hole.

Meanwhile, in Comparative Example 1, since no control hole was formed, the injection amount of the resin composition could not be confirmed, and in Comparative Example 2, the injection amount of the resin composition could be confirmed through the control holes, but it was difficult to be easily determined and the resin composition was also discharged through the control holes. Therefore, it can be confirmed that Comparative Example 1 and Comparative Example 2 are inadequate for the automation process application.

The invention claimed is:

1. A battery module case, comprising:
a bottom plate and a sidewall, the bottom plate and the sidewall together forming an inner space configured to receive a resin layer and a plurality of battery cells;
a control hole and an injection hole formed in the bottom plate or the sidewall; and
a light transmissive film located on the control hole, wherein the light transmissive film comprises a base material and an adhesive layer formed on the base material,
wherein the light transmissive film is located on the control hole, and the light transmissive film is not located on the injection hole.

2. The battery module case according to claim 1, wherein the injection hole is configured to receive an injection of a resin composition therethrough, and wherein the battery module case further comprises the resin layer, the resin layer being formed from the resin composition.

3. The battery module case according to claim 1, wherein the bottom plate or the sidewall has a thermally conductive region at a portion thereof, the thermally conductive region being in contact with the resin layer.

4. The battery module case according to claim 1, wherein the control hole is formed in the bottom plate.

5. The battery module case according to claim 1, wherein a position of the control hole satisfies Equation 1 below:

$$1/50 \leq P = B/L \leq 1/2 \quad \text{[Equation 1]}$$

wherein, P represents the position of the control hole formed in the bottom plate or the sidewall, L represents a total length of the bottom plate or the sidewall measured from one end surface of the bottom plate or the sidewall to an opposite end surface, and B represents a distance from the one end surface to the control hole.

6. The battery module case according to claim 1, wherein the control hole is one of a plurality of control holes, and the light transmissive film is formed extending along a direction in which the plurality of control holes are arranged.

7. The battery module case according to claim 1, wherein the adhesive layer is disposed only in a partial region of the base material and not in a remaining region of the base material.

8. The battery module case according to claim 7, wherein the partial region of the base material in which the adhesive layer is disposed and the remaining region of the base material in which the adhesive layer is not disposed are bent relative to one another at a predetermined angle, and the partial region of the base material and the remaining region of the base material have different optical characteristics.

9. The battery module case according to claim 1, wherein all of the base material or the partial region of the base material comprises an absorbent component that is configured to absorb light of any wavelength.

10. The battery module case according to claim 1, wherein an antireflection film is disposed on the all of the base material or the partial region of the base material.

11. A battery module, comprising:
a battery module case including a bottom plate and a sidewall, the bottom plate and the sidewall together forming an inner space,
a control hole and an injection hole formed in the bottom plate or the sidewall;
a light transmissive film located on the control hole;
a plurality of battery cells disposed in the inner space of the battery module case; and
a resin layer disposed in the inner space of the battery module case,
wherein the resin layer is in contact with at least one of the plurality of battery cells and the bottom plate or the sidewall,
wherein the light transmissive film is distinct from the resin layer, and
wherein the light transmissive film is located on the control hole, and the light transmissive film is not located on the injection hole.

12. The battery module according to claim 11, wherein the injection hole is configured to receive injection of a resin composition therethrough, the resin layer being formed from the resin composition.

13. The battery module according to claim 11, wherein the light transmissive film comprises a base material and an adhesive layer formed on the base material.

14. The battery module according to claim 11, wherein a surface of at least one of the battery cells comprises an absorbent component that is configured to absorb light of any wavelength.

15. The battery module according to claim 11, wherein the resin layer has thermal conductivity of 1.5 W/mK or more.

16. The battery module according to claim 11, wherein the resin layer comprises a filler.

17. A battery pack comprising two or more battery modules each according to claim 11, the battery modules being electrically connected to each other.

18. An automobile comprising the battery module according to claim 11.

19. An automobile comprising the battery pack of claim 17.

* * * * *